United States Patent [19]
Aoki

[11] Patent Number: 5,966,249
[45] Date of Patent: Oct. 12, 1999

[54] ZOOM LENS BARREL AND METHOD FOR ADJUSTING BACK FOCAL DISTANCE THEREOF

[75] Inventor: Nobuaki Aoki, Tokyo, Japan

[73] Assignee: Asahi Kogaku Kogyo Kabushiki Kaisha, Tokyo, Japan

[21] Appl. No.: 08/917,290

[22] Filed: Aug. 25, 1997

[30] Foreign Application Priority Data

Aug. 27, 1996 [JP] Japan .................................... 8-225369

[51] Int. Cl.⁶ ................................................. G02B 15/14
[52] U.S. Cl. .......................................... 359/699; 359/694
[58] Field of Search .................................... 359/694, 699, 359/700, 823, 826

[56] References Cited

U.S. PATENT DOCUMENTS

| | | | |
|---|---|---|---|
| 4,974,949 | 12/1990 | Tanaka | 350/429 |
| 5,245,476 | 9/1993 | Shono | 359/699 |
| 5,349,475 | 9/1994 | Nomura et al. | 359/694 |
| 5,485,315 | 1/1996 | Nomura et al. | 359/701 |
| 5,537,262 | 7/1996 | Aoki et al. | 359/822 |
| 5,579,173 | 11/1996 | Hamasaki et al. | 359/700 |
| 5,589,987 | 12/1996 | Tanaka | 359/701 |

*Primary Examiner*—Georgia Epps
*Assistant Examiner*—Suzanne Letendre
*Attorney, Agent, or Firm*—Greenblum & Bernstein P.L.C.

[57] ABSTRACT

A zoom lens barrel includes a front lens holder frame with a male helicoid and a rear lens holder frame including a cam follower pin. A linear movement guide mechanism guides the front and rear lens holder frames to move in the optical axis direction. A rotatable drive ring, with a female helicoid, engages with the male helicoid of the front lens holder frame and with a cam groove in which the cam follower pin of the rear lens holder frame is fitted. The cam groove is provided with a plurality of spaced back focal distance adjusting sections parallel with the lead of the helicoids and with a plurality of zoom sections that connect the adjacent ones of the spaced back focal distance adjusting sections and that are not parallel with the lead of the helicoids. The drive ring is always stopped when the cam follower pin is located in any one of the back focal distance adjusting sections.

10 Claims, 5 Drawing Sheets

100
ZOOM LENS BARREL AND METHOD FOR ADJUSTING BACK FOCAL DISTANCE THEREOF

BACKGROUND OF THE INVENTION

1. Field of the Invention

The present invention relates to a zoom lens barrel and more precisely it relates to a zoom lens barrel in which the back focal distance (back focus) can be easily adjusted. The present invention also relates to a method for adjusting the back focal distance using the zoom lens barrel.

2. Description of the Related Art

In a zoom lens barrel, it is necessary to carry out the zoom adjustment and back focus adjustment upon assembly of the same. The zoom adjustment is effected to make the focal position at the short focal length extremity and the focal position at the long focal length extremity identical. In a two-lens group type zoom lens, the zoom adjustment is executed by varying the distance between a first lens group and a second lens group. In the back focus adjustment, the entirety of the lens system is moved in the optical axis direction without varying the distance between the first and second lens groups to make the focal position coincident with the rail surface (film surface) of the camera.

In conventional zoom lens barrels, the zoom adjustment and the back focus adjustment are mechanically effected by means of complicated adjusting mechanisms, thus resulting in a large camera.

SUMMARY OF THE INVENTION

It is an object of the present invention to provide a zoom lens barrel in which the back focus adjustment can be easily effected.

Another object of the present invention is to provide a method for adjusting the back focal distance of a zoom lens barrel.

To achieve the object mentioned above, according to an aspect of the present invention, a zoom lens barrel, includes a front lens holder frame which includes on an outer peripheral surface, a helicoid which holds a front lens group. A rear lens holder frame includes a radially extending cam follower pin which holds a rear lens group. A linear movement guide mechanism guides the front lens holder frame and the rear lens holder frame to move in the optical axis direction. A rotatable drive ring which includes a helicoid which engages with the helicoid of the front lens holder frame and a cam groove in which the cam follower pin of the rear lens holder frame is fitted. The cam groove is provided with a plurality of spaced back focal distance adjusting sections parallel with the lead of the helicoids and a plurality of zoom sections that connect the adjacent back focal distance adjusting sections and that are not parallel with the lead of the helicoids. A stop system that stops the drive ring when the cam follower pin is located in any back focal distance adjusting section is also provided.

With this arrangement, the back focal distance can be adjusted by controlling the stop position of the drive ring, taking into account the amount of the back focal distance to be adjusted.

According to another aspect of the present invention, there is provided a method for adjusting a back focal distance of a zoom lens barrel which includes a front lens holder frame which includes, on an outer peripheral surface, a helicoid and which holds a front lens group. A rear lens holder frame is provided with a radially extending cam follower pin which holds a rear lens group. A linear movement guide mechanism guides the front lens holder frame and the rear lens holder frame to move in the optical axis direction. A rotatable drive ring includes a helicoid which engages with the helicoid of the front lens holder frame and a cam groove in which the cam follower pin of the rear lens holder frame is fitted. The cam groove is being provided with a plurality of spaced back focal distance adjusting sections parallel with the lead of the helicoids and a plurality of zoom sections that connect the adjacent back focal distance adjusting sections and that are not parallel with the lead of the helicoids. Thus, wherein the drive ring is stopped when the cam follower pin is located in any back focal distance adjusting section, and when the stop position of the drive ring is determined, the amount of the back focal distance to be adjusted is taken into account.

The present disclosure relates to subject matter contained in Japanese Patent Application No. 08-225369 (filed Aug. 27, 1996) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

Figure 1:
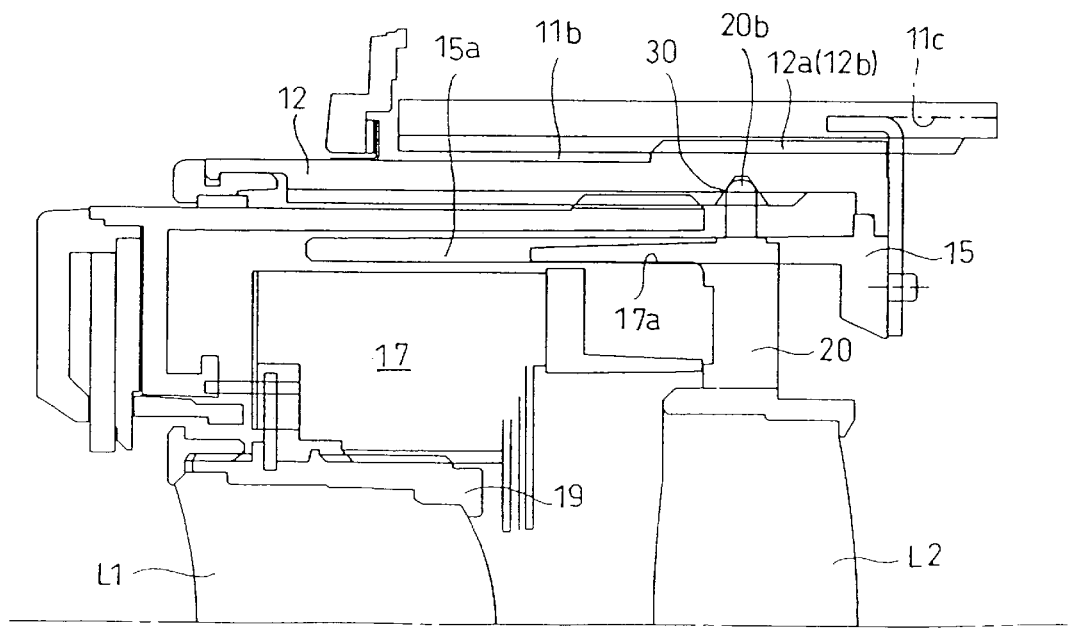
FIG. 1 is a longitudinal sectional view of a zoom lens barrel according to an embodiment of the present invention.
Figure 2:
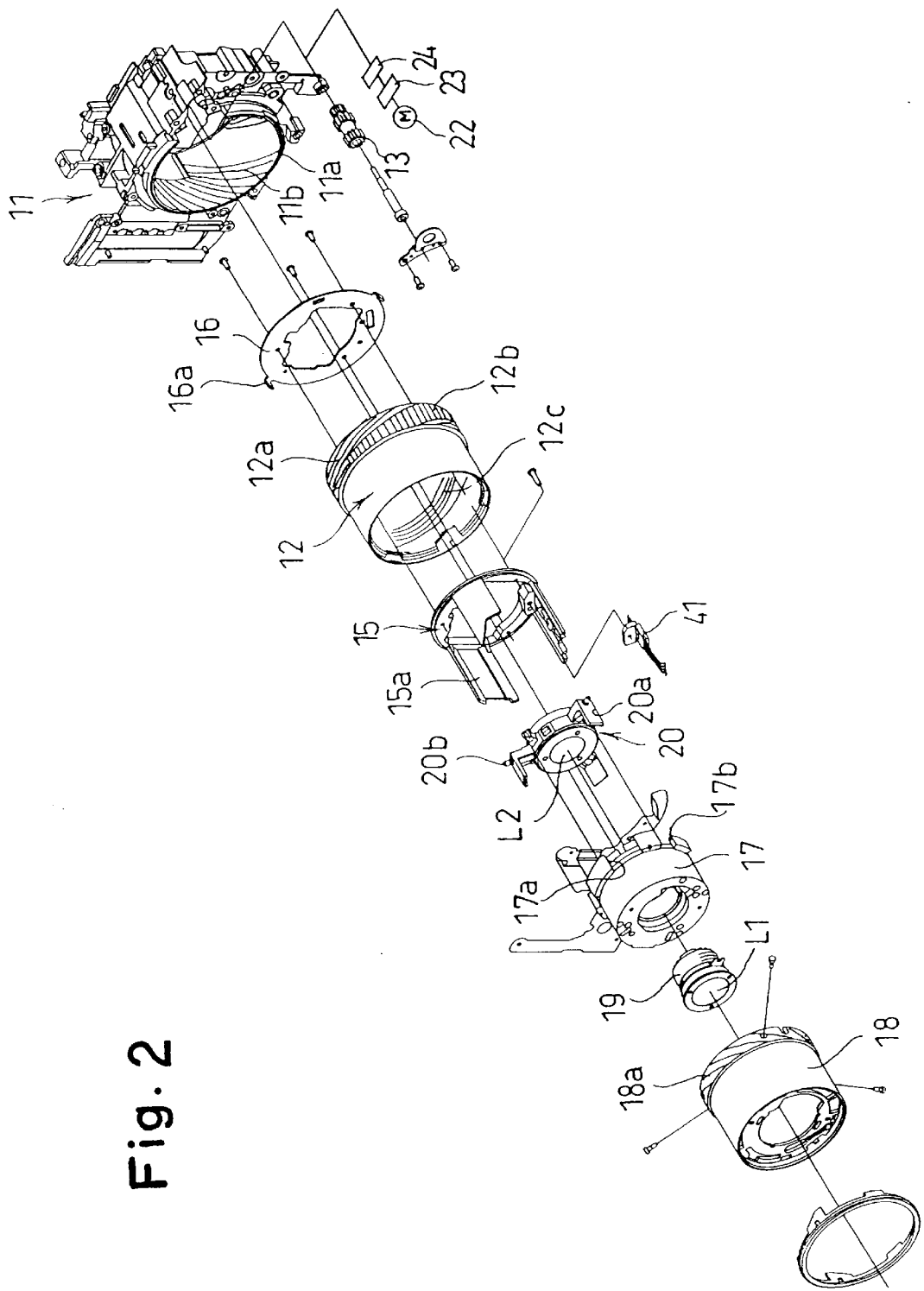
FIG. 2 is an exploded perspective view of FIG. 1.

In FIG. 1 the zoom lens barrel of the present invention is shown in a longitudinal cross section. FIG. 2 shows a housing 11 which is secured to a camera body is provided with a stationary barrel 11a which is provided on its inner peripheral surface with a female helicoid (internal thread) 11b. The female helicoid 11b is screw-engaged by a male helicoid (external thread) 12a formed on the outer peripheral surface of a drive ring (cam ring) 12. The drive ring 12 is provided with a spur gear 12b which is inclined at an angle parallel with the lead of the male helicoid 12a and is formed on a cut-away portion of the male helicoid 12a. The spur gear 12b meshes with a pinion 13 held on the housing 11. The engagement of the spur gear 12b with the pinion 13 is maintained regardless of the axial movement of the drive ring 12. The drive ring 12 is provided on the inner surface thereof with a female helicoid (internal thread) 12c.

A linear movement guide member 15 is fitted in the drive ring 12 which is movable in the axial direction together with the drive ring and is rotatable relative to the drive ring 12. The linear movement guide member 15 is secured to a linear movement guide plate 16 which is provided with radial projections 16a which are fitted in linear movement guide grooves 11c formed in the female helicoid 11b. The linear movement guide member 15 is provided with guide legs 15a that project forward and that are fitted in guide grooves 17a formed in a shutter unit 17. The shutter unit 17 is secured to a front lens holder frame 18 to constitute a part of the same. The front lens holder frame 18 is provided on the outer peripheral surface thereof with a male helicoid (external thread) 18a which is engaged with the female helicoid 12c of the drive ring 12. The direction of the external thread (male helicoid) 18a is opposite to the direction of the external thread (male thread) 12a.

A focusing cylinder 19 which holds the front lens group L1 at the center thereof is screw-engaged in the shutter unit 17. The shutter unit 17 rotates the focusing cylinder 19 by an angular displacement corresponding to the object distance information to move the front lens group L1 to the focal position and drives shutter blades provided therein to open and close in accordance with the object distance information.

A rear lens holder frame 20 which holds the rear lens group L2 is provided with linear movement guide legs 20a which are fitted in linear movement guide grooves 17b formed on the shutter unit 17. The linear movement guide member 15 is guided by the housing 11 to move linearly in the axial direction. The shutter unit 17 (front lens holder frame 18 and front lens group L1) is guided by the linear movement guide member 15 to move linearly in the axial direction. The rear lens holder frame 20 (holding rear lens group L2) is guided by the shutter unit to move linearly in the axial direction. Consequently, the front lens group L1 and the rear lens group L2 are linearly moved in the axial direction.

The rear lens holder frame 20 is provided with cam followers 20b that project in the radial direction. The drive ring 12 is provided on the inner peripheral surface thereof with a cam groove 30 whose profile is shown in FIG. 3.

In the zoom lens barrel constructed as above, when the pinion 13 is rotated by a motor 22 through a reduction gear train 23, the spur gear 12b which meshes with the pinion 13 is driven to rotate the drive ring 12. Consequently, the drive ring 12 is moved in the optical axis direction while rotating, in accordance with the engagement of the male and female helicoids 12a and 11b, so that the linear movement guide member 15 is linearly moved together with the drive ring 12. As a result, the front lens holder frame 18 (holding front lens group L1) is moved relative to the drive ring 12 in accordance with the engagement of the female helicoid 12c and the male helicoid 18a, while rotating relative to the drive ring 12.

On the other hand, the rear lens holder frame 20 (holding rear lens group L2) is moved in accordance with the cam profile of the cam groove 30 to perform the zooming operation with the first lens group L1. The angular displacement of the drive ring 12 is detected by an encoder 24 provided in the motor 22 or the reduction gear 23.

Figure 3:
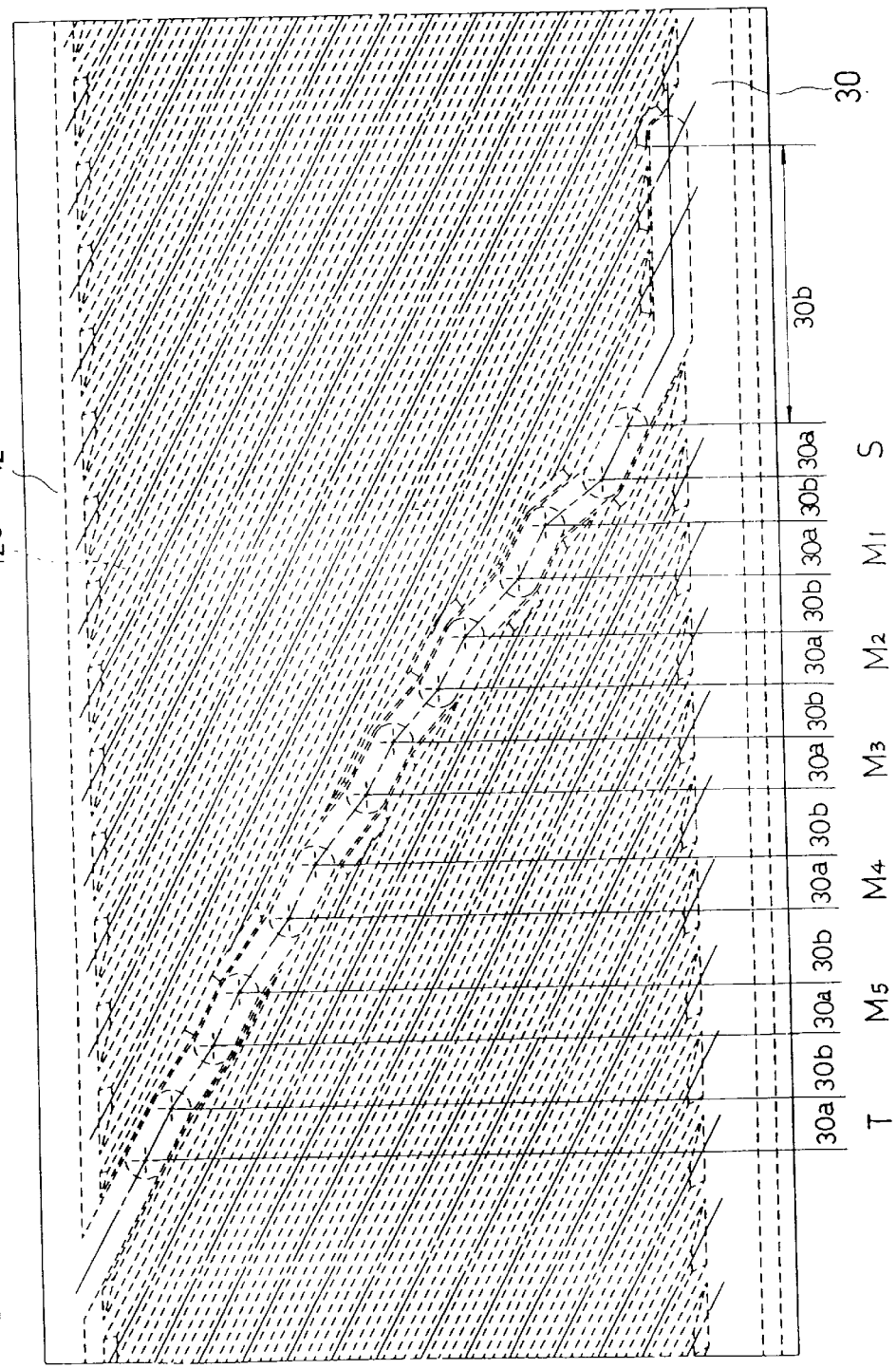
FIG. 3 is a developed view of a drive ring.

As can be seen in FIG. 3, the cam groove 30 includes a plurality of back focal distance adjusting sections 30a (fB adjustment sections or stepped stop sections) parallel with the lead of the female helicoid 12c, and a plurality of zoom sections 30b that are not parallel with the lead of the female helicoid 12c and that connect the adjacent fB adjustment sections. The fB adjustment sections 30a and the zoom sections 30b are alternately arranged.

In a conventional cam groove in a two-lens group type zoom lens barrel, the profile of the cam groove is set in such a way that no movement of an image position (focused position) determined by the front lens group L1 and the rear lens group L2 takes place over the entire track of the movement of the lens groups. However, in the cam groove 30 which is composed of the fB adjustment sections 30a and zoom sections 30b that are alternately arranged as shown in FIG. 3, it is impossible to prevent the image position determined by the front and rear lens groups L1 and L2 from being moved over the entire track of the movement. To this end, the top position of the drive ring 12 in the present embodiment controlled such that the drive ring 12 stops only when he cam followers 20b of the rear lens holder frame 20 are located in the fB adjustment sections 30a of the cam groove 30. Thus, no movement of the image position determined by the front and rear lens groups L1 and L2 takes place when the cam followers 20b are stopped in any portion of each of the stepped fB adjustment sections 30a. In the embodiment illustrated in FIG. 3, the fB adjustment sections 30a include five intermediate focal length sections M1, M2, M3, M4 and M5 between the wide angle extremity section S and the telephoto extremity section T (i.e., there are seven steps in total).

Figure 4:
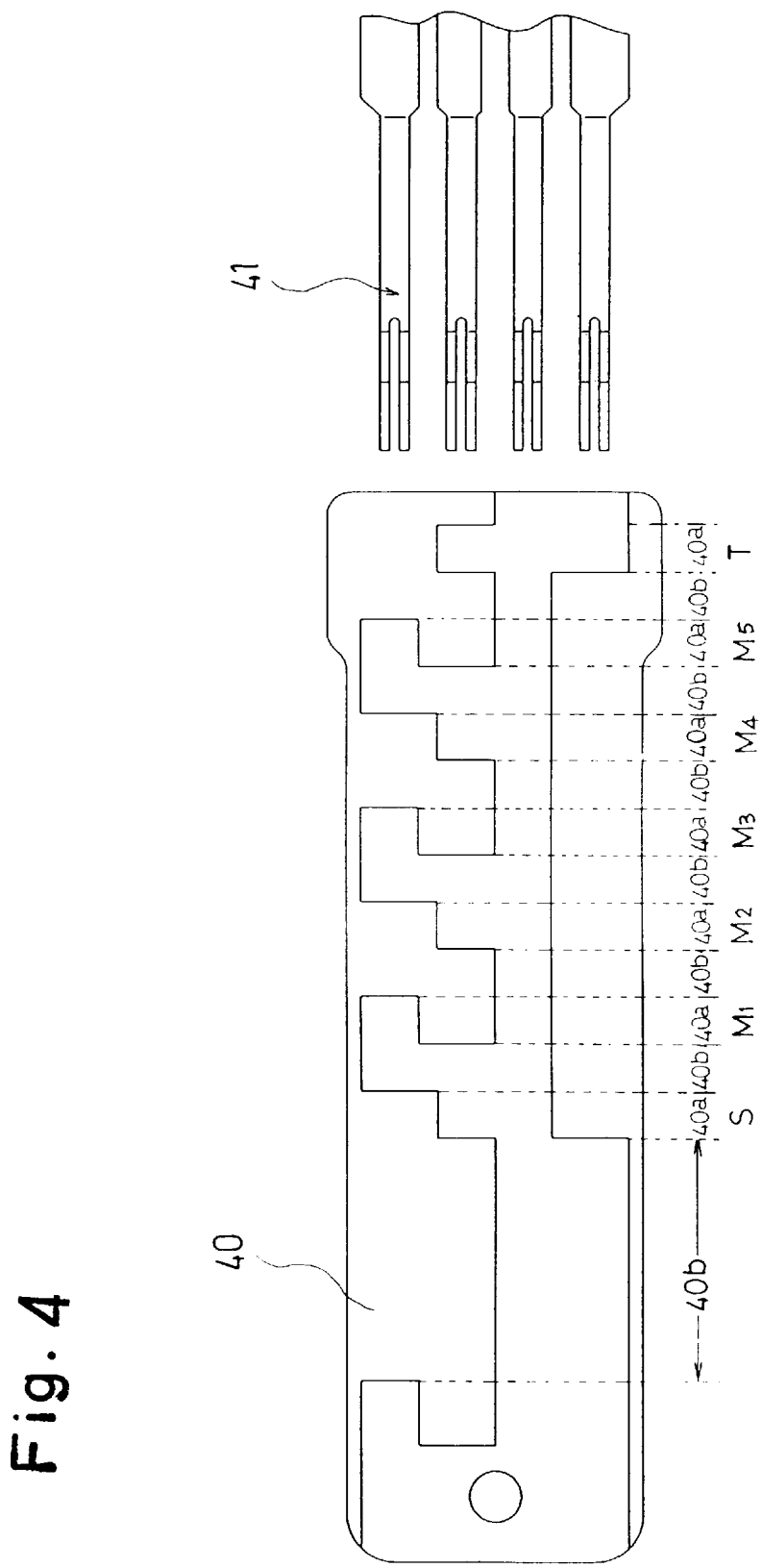
FIG. 4 is a plan view of a zoom code plate which is adapted to control the stop position of the drive ring.

To control the stop position of the drive ring 12 stepwise, as mentioned above, an elongated code plate 40 (shown in FIG. 4) which extends in the direction parallel with the optical axis is secured to the inner surface of the front lens holder frame 18. The linear movement guide member 15 is provided with brushes 41 which come into contact with the code plate 40. FIG. 4 shows a developed view of the code plate 40 and the brushes 41. The front lens holder frame 18, which linearly moves in the optical axis direction, is moved relative to the linear movement guide member 15, which also linearly moves in the optical axis direction, when the drive ring 12 is rotated. The displacement of the front lens holder frame 18 relative to the linear movement guide member 15 is proportionate to the angular displacement of the drive ring 12. Therefore, the angular displacement of the drive ring 12 can be determined by detecting the amount of the relative movement between the front lens holder frame 18 and the linear movement guide member 15, using the code plate 40 and the brushes 41.

The code plate 40 is provided with a plurality of fB adjustment section detecting sections (lands) 40a and a plurality of zoom section detecting sections (lands) 40b, corresponding to the fB adjustment sections 30a and the zoom sections 30b of the cam groove 30, respectively. The fB adjustment section detecting sections (lands) 40a and the zoom section detecting sections (lands) 40b are alternately arranged. Thus, the wide angle extremity section S, the telephoto extremity section T and the five intermediate focal length sections M1 through M5 can be detected by the code plate 40 and the brushes 41.

In the zoom lens barrel of the present embodiment, the back focal distance can be adjusted as follows.

The zooming adjustment is effected in which the optical system is focused at the short focal length extremity and the long focal length extremity, by varying the distance between the front lens group L1 and the rear lens group L2, so that the focal point at the short focal length extremity and the focal point at the long focal length extremity are identical. The zooming adjustment is mechanically effected by a zooming mechanism per se known. Upon completion of the zooming adjustment, the distance between the focal position and the rail surface (i.e., the film surface) is detected (i.e., calculated). The distance thus obtained corresponds to the adjustment of the back focal distance. Namely, the front lens group L1 and the rear lens group L2 should be moved in the optical axis direction by this distance without varying the distance therebetween for the back focus adjustment, so that the focal position is located on the rail surface (i.e., film surface).

Figure 5:
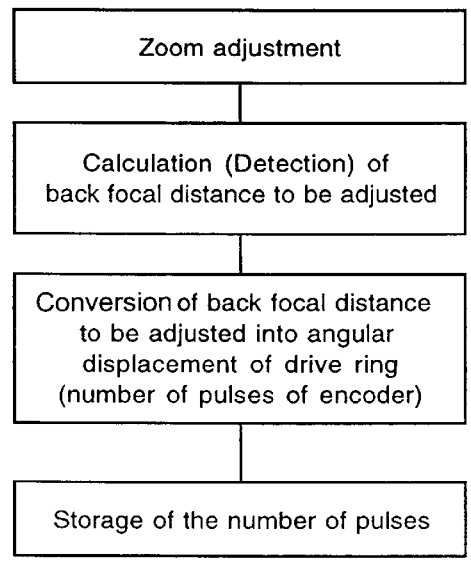
FIG. 5 is a flow chart of the storage operation of the number of pulses used for the back focus adjustment.

The front lens group L1 and the rear lens group L2 are moved in the optical axis direction when the drive ring 12 is rotated. If the rotation of the drive ring 12 takes place when the cam followers 20b of the rear lens holder frame 20 (rear lens group L2) are located in the fB adjustment sections 30a of the cam groove 30, the front lens holder frame (and front lens group L1) and the rear lens holder frame 20 (and rear lens group L2) are moved in the optical axis direction without varying the distance therebetween, since the cam profile of the fB adjustment sections 30a is in parallel with the lead of the female helicoid 12c. The angular displacement of the drive ring 12 has a predetermined relationship to the axial displacement of the front and rear lens groups L1 and L2. The angular displacement of the drive ring 12 is detected by the encoder 24. Therefore, the back focal distance to be adjusted, which is detected after the zooming operation mentioned above, is represented by the angular displacement of the drive ring 12 (i.e., the number of pulses of the encoder 24) and is stored in a memory (FIG. 5).

Figure 6:
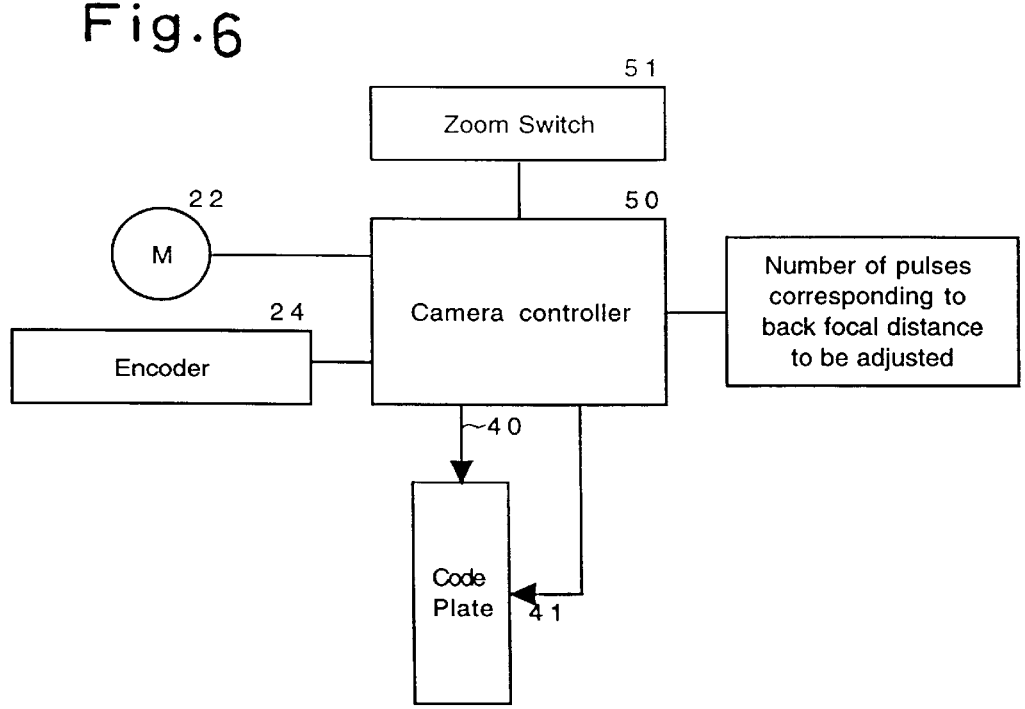
FIG. 6 is a block diagram of a control system of a zoom lens barrel according to the present invention.

On the other hand, as can be seen in FIG. 6, the camera controller 50 drives the motor 22 in the forward or reverse direction in response to an input signal from a zoom switch 51 to rotate the drive ring 12 to thereby to move the front and rear lens groups L1 and L2 in the optical axis direction. The code plate 40 and the brushes 41 detect the angular displacement of the drive ring 12 to control the motor 22 through the encoder 24, so that the cam followers 20b of the rear lens holder frame 20 are stopped in any one of the fB adjustment sections 30a.

To control the stop of the motor 22, the number of pulses corresponding to the amount of the back focal distance to be adjusted is added (or subtracted) to (or from) the number of the control pulses determined by the encoder 24. Namely, the stop position of the drive ring 12 is controlled by always taking into account the angular displacement of the drive ring 12 corresponding to the back focal distance to be adjusted. For example, the position of the cam followers 20b before the number of pulses corresponding to the amount of the back focal distance to be adjusted is added (or subtracted) to (or from) the number of the control pulses determined by the encoder 24 are set in the middle of each fB adjustment sections 30a. According to this arrangement, the cam followers 20b will not reach the zoom sections 30b upon the back focal adjustment regardless of the moving direction of the drive ring 12.

As mentioned above, according to the present embodiment, the adjustment of the back focal distance is substantially completed when the number of pulses of the encoder 24 corresponding to the amount of adjustment of the back focal distance thus detected is stored in the memory. Note that in the control of the angular displacement of the drive ring 12 corresponding to the amount of the back focal distance to be adjusted, the stop position of the drive ring 12 is controlled so that the cam followers 20b of the rear lens holder frame 20 do not reach the zoom sections 30b beyond the fB adjustment sections 30a of the cam groove 30.

As may be understood from the above discussion, according to the present invention, the back focal distance can be easily adjusted in accordance with a simple software in which the back focal distance to be adjusted is detected; the angular displacement of the drive ring corresponding thereto is represented by the number of pulses of the drive motor; and the stop position of the drive ring is determined in accordance with the number of pulses.

What is claimed is:

1. A zoom lens barrel comprising:
   a front lens holder frame including an outer peripheral surface with a helicoid and holding a front lens group;
   a rear lens holder frame including a radially extending cam follower pin and holding a rear lens group;
   a linear movement guide mechanism which guides the front lens holder frame and the rear lens holder frame to move in an optical axis direction;
   a rotatable drive ring including a helicoid which engages with the helicoid of the front lens holder frame and a cam groove in which the cam follower pin of the rear lens holder frame is engaged;
   the cam groove is provided with a plurality of spaced back focal distance adjusting sections parallel with the lead of the helicoids and a plurality of zoom sections that connect adjacent ones of the spaced back focal distance adjusting sections and that are not parallel with the lead of the helicoids; and
   a stop system that stops the drive ring when the cam follower pin is located in any one of the back focal distance adjusting sections.

2. A zoom lens barrel according to claim 1, said stop system controlling stopping of the drive ring in association with an amount of the back focal distance to be adjusted.

3. The zoom lens barrel according to claim 1, said stop system comprising a code plate secured to an inner surface of said front lens holder frame and a plurality of brushes secured to said linear movement guide member, said brushes contacting said code plate, said code plate provided with a number of sections corresponding to said plurality of spaced back focal distance adjusting sections and to said plurality of zoom sections.

4. The zoom lens barrel according to claim 1, further comprising an encoder, a motor that drives said drive ring, said motor controlled by pulses output by said encoder, a memory, a number of pulses corresponding to a back focal distance being stored in said memory, said number of pulses output by said encoder and said number of pulses corresponding to said back focal distance being utilized to control said motor.

5. The zoom lens barrel according to claim 1, further comprising a motor that drives said rotatable drive ring, said stop system comprising a system that controls said motor in accordance with data related to a back focal distance stored in a memory.

6. The zoom lens barrel according to claim 5, further comprising an encoder that outputs control pulses to said motor, said control system controlling said motor in accordance with a combination of said control pulses and with said data related to said back focal distance stored in said memory.

7. The zoom lens barrel according to claim 1, wherein when said cam follower pin of said rear lens holder frame is positioned in one of said plurality of spaced back focal distance adjustment sections, rotation of said drive ring moves said front lens holder frame and said rear lens holder frame along the optical axis direction without varying a distance between said front lens holder frame and said rear lens holder frame.

8. A method for adjusting a back focal distance of a zoom lens barrel which includes a front lens holder frame including an outer peripheral surface with a helicoid and holding a front lens group, a rear lens holder frame including a radially extending cam follower pin and holding a rear lens group, a linear movement guide mechanism which guides the front lens holder frame and the rear lens holder frame to move in the optical axis direction, and a rotatable drive ring including a helicoid which engages with the helicoid of the front lens holder frame and a cam groove in which the cam follower pin of the rear lens holder frame is engaged with cam groove being provided with a plurality of spaced back focal distance adjusting sections parallel with the lead of the helicoids and a plurality of zoom sections that connect adjacent ones of the spaced back focal distance adjusting sections and that are not parallel with the lead of the helicoids, the method comprising:

detecting whether the cam follower pin is located in any one of the back focal distance adjusting sections, and stopping the drive ring when the cam follower pin is located in any one of the back focal distance adjusting sections.

9. A method according to claim 8, further comprising taking into account the amount of the back focal distance to be adjusted when the stop position of the drive ring is determined.

10. A zoom lens barrel comprising:

a front lens holder frame;

a rear lens holder frame;

a linear movement guide mechanism which guides said front lens holder frame and said rear lens holder frame to move along an optical axis direction;

a rotatable drive ring which drives said front lens holder frame and said rear lens holder frame along the optical axis direction;

a motor that drives said drive ring;

a control mechanism that controls an operation of said motor, said controller including an encoder which provides a number of control pulses to said motor;

a memory in which a number of pulses corresponding to a displacement of said drive ring corresponding to a back focal distance are stored;

wherein the number of control pulses output by said encoder for driving said motor is adjusted in accordance with the number of pulses stored in said memory corresponding to the back focal distance.

* * * * *